US008065070B2

(12) United States Patent
Czekala et al.

(10) Patent No.: US 8,065,070 B2
(45) Date of Patent: Nov. 22, 2011

(54) INTERNAL COMBUSTION ENGINE HAVING COMMON POWER SOURCE FOR ION CURRENT SENSING AND FUEL INJECTORS

(75) Inventors: Michael Damian Czekala, Canton, MI (US); Ross Dykstra Pursifull, Dearborn, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 12/973,191

(22) Filed: Dec. 20, 2010

(65) Prior Publication Data

US 2011/0087422 A1 Apr. 14, 2011

Related U.S. Application Data

(62) Division of application No. 11/876,798, filed on Oct. 23, 2007, now Pat. No. 7,878,177.

(51) Int. Cl.
*F02D 41/02* (2006.01)
*F02M 51/00* (2006.01)
*G01M 15/00* (2006.01)

(52) U.S. Cl. ...... 701/103; 123/478; 123/644; 73/114.08

(58) Field of Classification Search .................. 123/478, 123/490, 604, 618, 620, 623, 640, 641, 644; 701/111, 113–115; 73/114.08, 114.67; 361/152–156; 702/64, 65, 182, 183, 185
See application file for complete search history.

(56) References Cited

U.S. PATENT DOCUMENTS 5,495,841 A 3/1996 Gillbrand et al.
5,572,975 A 11/1996 Gillbrand et al.
5,769,049 A 6/1998 Nytomt et al.
6,032,650 A 3/2000 Rask
6,196,054 B1 3/2001 Okamura et al.
6,199,540 B1 3/2001 Katashiba et al.
6,343,500 B1 2/2002 Katogi et al.
7,117,852 B2 10/2006 Santero et al.
7,191,765 B2 3/2007 Santero
7,352,143 B2 * 4/2008 Inaba et al. .................. 318/139
7,392,793 B2 7/2008 Hayakawa
7,546,830 B2 6/2009 Nagase et al.
7,621,259 B2 11/2009 Mayuzumi (Continued)

FOREIGN PATENT DOCUMENTS

JP 11-082149 A 8/1997

OTHER PUBLICATIONS

English Abstract corresponding to JP 11-082149. GB Search Report dated Oct. 7, 2008 from related application GB 0812462.0 (3 pgs.).

*Primary Examiner* — Willis Wolfe, Jr.
*Assistant Examiner* — Johnny Hoang
(74) *Attorney, Agent, or Firm* — Julia Voutyras; Brooks Kushman P.C.

(57) ABSTRACT

An electrical power system for an engine powered at least in part by a battery having a battery voltage and including a fuel injector and at least one ionization sensor includes at least one common power supply connected to the fuel injector and the ionization sensor and supplying a voltage higher than the battery voltage for operation of the fuel injector and the ionization sensor at least during an ionization sensing period after spark discharge.

20 Claims, 3 Drawing Sheets

U.S. PATENT DOCUMENTS

| | | | | |
|---|---|---|---|---|
| 7,677,230 | B2 * | 3/2010 | Meyer et al. | 123/638 |
| 2005/0200202 | A1 * | 9/2005 | Mihara | 307/10.1 |
| 2006/0162689 | A1 | 7/2006 | Winkelman et al. | |
| 2010/0057324 | A1 * | 3/2010 | Glugla et al. | 701/102 |
| 2010/0262404 | A1 * | 10/2010 | Bertness | 702/183 |
| 2010/0299053 | A1 * | 11/2010 | Okumoto et al. | 701/113 |
| 2010/0319646 | A1 * | 12/2010 | Yang | 123/179.28 |
| 2011/0017172 | A1 * | 1/2011 | Shigenaga et al. | 123/406.26 |

* cited by examiner

INTERNAL COMBUSTION ENGINE HAVING COMMON POWER SOURCE FOR ION CURRENT SENSING AND FUEL INJECTORS

CROSS-REFERENCE TO RELATED APPLICATIONS

This application is a division of U.S. application Ser. No. 11/876,798 filed Oct. 23, 2007, now U.S. Pat. No. 7,878,177, the disclosure of which is hereby incorporated by reference in its entirety.

TECHNICAL FIELD

The present disclosure relates to systems and methods for supplying power for fuel injection and for ionization current sensing in internal combustion engines.

BACKGROUND

Various types of spark-ignition, compression-ignition, and combination internal combustion engines use direct injection of fuel into the combustion chamber to reduce fuel consumption and feedgas emissions. These may include direct-injection spark-ignition (DISI) engines fueled by gasoline or gasoline/alcohol mixtures, compression-ignition engines fueled by diesel fuel, or combination engines fueled by gasoline or other fuels that may operate in a spark-ignition mode and a compression-ignition mode, sometimes referred to as homogeneous charge compression ignition (HCCI) mode, for example. A high-voltage power supply may be provided to generate the current required for desired performance of the fuel injectors for these applications, with representative voltages in the range of 60V or more compared to the nominal battery voltage of 12V or 24V, for example.

Manufacturers continue to improve control of internal combustion engines to enhance fuel economy and performance while reducing feedgas emissions using more sophisticated sensing and processing hardware and software. To improve control of the combustion process, ionization current sensing (or ion sense) uses a bias voltage applied across a sensor positioned within the combustion chamber to generate a current signal indicative of the combustion quality and timing. The bias voltage for reliable ion current signals often exceeds the voltage available directly from the vehicle battery so that a boost circuit or high voltage power supply is used to provide a bias voltage in the range of 85V or more, for example. Some spark-ignition engines provide the high-voltage supply by switching the ignition coil or using the ignition coil to charge a capacitor during the spark generation and then discharge the capacitor to provide the bias voltage during the ion sense period. While suitable for some applications, these systems do not provide a bias voltage for ion sense when no spark is generated, such as during compression-ignition mode in HCCI engines, for example.

SUMMARY

An electrical power system for an engine powered at least in part by a battery having a battery voltage and including a fuel injector and at least one ionization sensor includes at least one common power supply connected to the fuel injector and the ionization sensor and supplying a voltage higher than the battery voltage for operation of the fuel injector and the ionization sensor at least during an ionization sensing period after spark discharge.

In one embodiment a direct injection multiple cylinder internal combustion engine includes an electrical system powered at least in part by a battery having an associated battery voltage, a fuel injector associated with each cylinder and configured to inject fuel directly into the combustion chamber of an associated cylinder in response to control signals during operation of the engine, at least one ionization sensor positioned within one of the cylinders, and at least one high-voltage power supply connected to at least one fuel injector and at least one ionization sensor for supplying a voltage higher than the battery voltage for operation of the fuel injector and the ionization sensor. Embodiments include ionization current sensors implemented by dedicated sensors, or by combination devices, such as a spark plug or glow plug, for example.

The present disclosure includes embodiments having various advantages. For example, the systems and methods of the present disclosure can provide ionization current sensing whether or not a spark plug discharge is provided, such as in compression ignition engines or operating modes, which include diesel engines and HCCI engines, for example. Using the high-voltage supply in spark-ignited applications for ignition coil charging facilitates more agile ignition timing with shorter ignition coil charge times and shorter dwell times, which in turn provides a larger time period for collecting ionization current data that is typically masked during coil/spark discharge. Using a single high-voltage power supply to actuate injectors and ionization sensing may provide a cost savings and reduce the number of control module pins required when the power supply is integrated within the engine controller.

The above advantages and other advantages and features will be readily apparent from the following detailed description of the preferred embodiments when taken in connection with the accompanying drawings.

DETAILED DESCRIPTION

Figure 1:
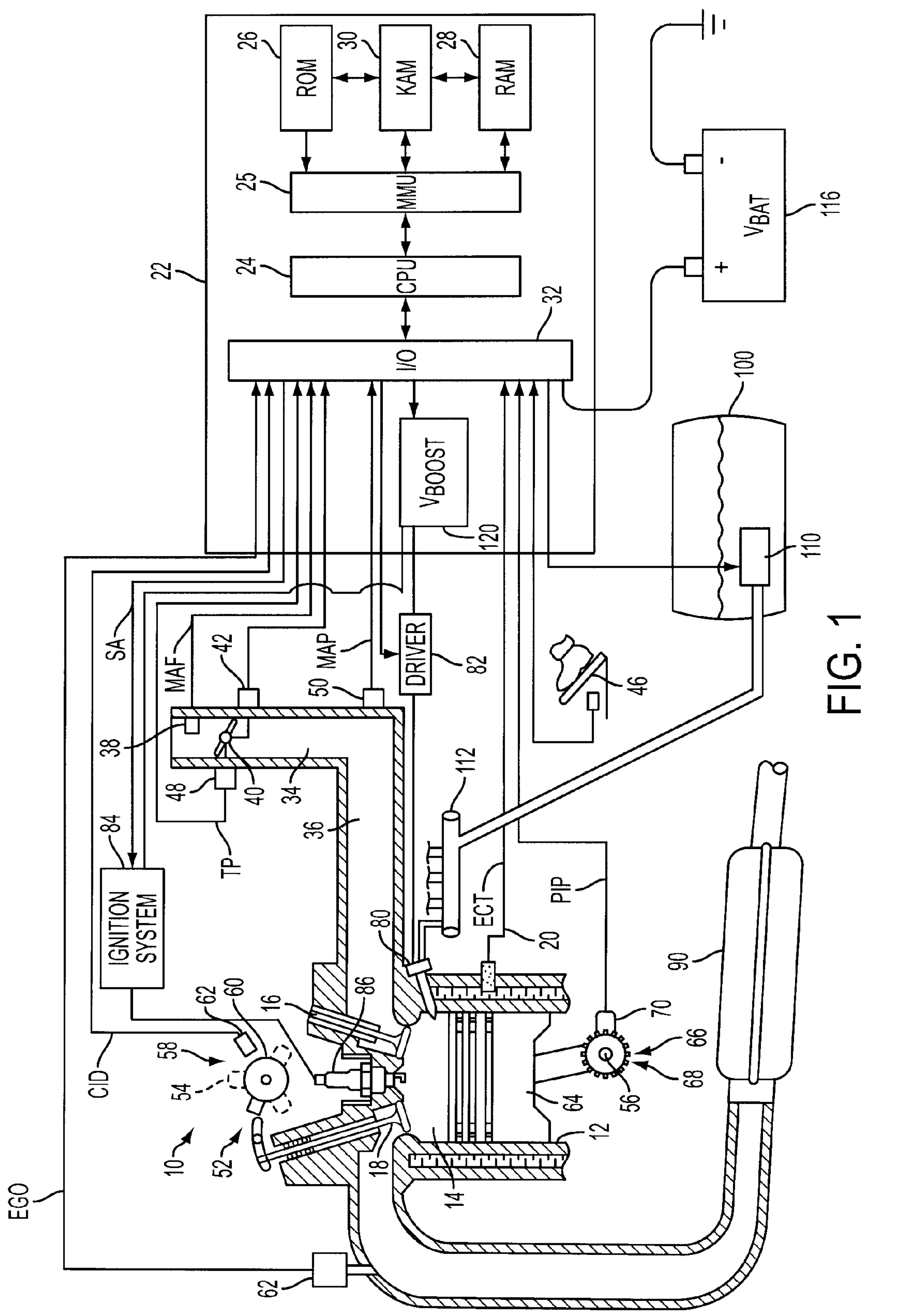
FIG. 1 is a block diagram illustrating operation of a system or method for controlling a direct injection internal combustion engine having a common power source for injectors and ion sense according to one embodiment of the present disclosure.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a, multi-cylinder, internal combustion engine with direct or incylinder injection and an ion sensing system that uses a spark plug, glow plug, or dedicated ionization sensor disposed within the cylinders. Those of ordinary skill in the art may recognize similar applications or implementations with other engine/vehicle technologies.

System 10 includes an internal combustion engine having a plurality of cylinders, represented by cylinder 12, with corresponding combustion chambers 14. As one of ordinary skill in the art will appreciate, system 10 includes various sensors and actuators to effect control of the engine. A single sensor or actuator may be provided for the engine, or one or more sensors or actuators may be provided for each cylinder 12, with a representative actuator or sensor illustrated and described. For example, each cylinder 12 may include four actuators that operate intake valves 16 and exhaust valves 18 for each cylinder in a multiple cylinder engine. However, the engine may include only a single engine coolant temperature sensor 20.

Controller 22 has a microprocessor 24, which is part of a central processing unit (CPU), in communication with memory management unit (MMU) 25. MMU 25 controls the movement of data among various computer readable storage media and communicates data to and from CPU 24. The computer readable storage media preferably include volatile and nonvolatile storage in read-only memory (ROM) 26, random-access memory (RAM) 28, and keep-alive memory (KAM) 30, for example. KAM 30 may be used to store various operating variables while CPU 24 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 24 in controlling the engine or vehicle into which the engine is mounted. The computer-readable storage media may also include floppy disks, CD-ROMs, hard disks, and the like.

System 10 includes an electrical system powered at least in part by a battery 116 providing a nominal voltage, $V_{BAT}$, which is typically either 12V or 24V, to power controller 22. As will be appreciated by those of ordinary skill in the art, the nominal voltage is an average design voltage with the actual steady-state and transient voltage provided by the battery varying in response to various ambient and operating conditions that may include the age, temperature, state of charge, and load on the battery, for example. Power for various engine/vehicle accessories may be supplemented by an alternator/generator during engine operation as well known in the art. A high-voltage power supply 120 generates a boosted nominal voltage, $V_{BOOST}$, relative to the nominal battery voltage and may be in the range of 85V-100V, for example, depending upon the particular application and implementation. Power supply 120 is used to power fuel injectors 80 and an ionization sensor, such as spark plug 86. As illustrated in the embodiment of FIG. 1, the high-voltage power supply 120 may be integrated with control module 22. Alternatively, an external high-voltage power supply may be provided if desired. Although illustrated as a single functional block in FIG. 1, some applications may have multiple internal or external high-voltage power supplies 120 that each service components associated with one or more cylinders or cylinder banks, for example.

CPU 24 communicates with various sensors and actuators via an input/output (I/O) interface 32. Interface 32 may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU 24. Examples of items that are actuated under control by CPU 24, through I/O interface 32, are fuel injection timing, fuel injection rate, fuel injection duration, throttle valve position, spark plug ignition timing (in the event that engine 10 is a spark-ignition engine), ionization current sensing and conditioning, and others. Sensors communicating input through I/O interface 32 may indicate piston position, engine rotational speed, vehicle speed, coolant temperature, intake manifold pressure, accelerator pedal position, throttle valve position, air temperature, exhaust temperature, exhaust air to fuel ratio, exhaust constituent concentration, and air flow, for example. Some controller architectures do not contain an MMU 25. If no MMU 25 is employed, CPU 24 manages data and connects directly to ROM 26, RAM 28, and KAM 30. Of course, the present invention could utilize more than one CPU 24 to provide engine control and controller 22 may contain multiple ROM 26, RAM 28, and KAM 30 coupled to MMU 25 or CPU 24 depending upon the particular application.

In operation, air passes through intake 34 and is distributed to the plurality of cylinders via an intake manifold, indicated generally by reference numeral 36. System 10 preferably includes a mass airflow sensor 38 that provides a corresponding signal (MAF) to controller 22 indicative of the mass airflow. A throttle valve 40 may be used to modulate the airflow through intake 34. Throttle valve 40 is preferably electronically controlled by an appropriate actuator 42 based on a corresponding throttle position signal generated by controller 22. The throttle position signal may be generated in response to a corresponding engine output or demanded torque indicated by an operator via accelerator pedal 46. A throttle position sensor 48 provides a feedback signal (TP) to controller 22 indicative of the actual position of throttle valve 40 to implement closed loop control of throttle valve 40.

A manifold absolute pressure sensor 50 is used to provide a signal (MAP) indicative of the manifold pressure to controller 22. Air passing through intake manifold 36 enters combustion chamber 14 through appropriate control of one or more intake valves 16. Intake valves 16 and exhaust valves 18 may be controlled using a conventional camshaft arrangement, indicated generally by reference numeral 52. Camshaft arrangement 52 includes a camshaft 54 that completes one revolution per combustion or engine cycle, which requires two revolutions of crankshaft 56 for a four-stroke engine, such that camshaft 54 rotates at half the speed of crankshaft 56. Rotation of camshaft 54 (or controller 22 in a variable cam timing or camless engine application) controls one or more exhaust valves 18 to exhaust the combusted air/fuel mixture through an exhaust manifold. A cylinder identification sensor 58 provides a signal (CID) once each revolution of the camshaft or equivalently once each combustion cycle from which the rotational position of the camshaft can be determined. Cylinder identification sensor 58 includes a sensor wheel 60 that rotates with camshaft 54 and includes a single protrusion or tooth whose rotation is detected by a Hall effect or variable reluctance sensor 62. Cylinder identification sensor 58 may be used to identify with certainty the position of a designated piston 64 within cylinder 12 for use in determining fueling or ignition timing, for example.

Additional rotational position information for controlling the engine is provided by a crankshaft position sensor 66 that includes a toothed wheel 68 and an associated sensor 70. In one embodiment, toothed wheel 68 includes thirty-five teeth equally spaced at ten-degree (10°) intervals with a single twenty-degree gap or space referred to as a missing tooth. In combination with cylinder identification sensor 58, the missing tooth of crankshaft position sensor 66 may be used to generate a signal (PIP) used by controller 22 for fuel injection and ignition timing. A dedicated integrated circuit chip (EDIS) within controller 22 may be used to condition/process the raw rotational position signal generated by position sensor 66 and outputs a signal (PIP) once per cylinder per combustion cycle. Crankshaft position sensor 66 may also be used to determine engine rotational speed and to identify cylinder combustion events based on an absolute, relative, or differential engine rotation speed where desired.

An exhaust gas oxygen sensor 62 provides a signal (EGO) to controller 22 indicative of whether the exhaust gasses are lean or rich of stoichiometry. Depending upon the particular application, sensor 62 may provide a two-state signal corresponding to a rich or lean condition, or alternatively a signal that is proportional to the stoichiometry of the exhaust feedgas. This signal may be used to adjust the air/fuel ratio, or control the operating mode of one or more cylinders, for example. The exhaust gas is passed through the exhaust manifold and one or more emission control or treatment devices 90 before being exhausted to atmosphere.

A fuel delivery system includes a fuel tank 100 with a fuel pump 110 for supplying fuel to a common fuel rail 112 that supplies injectors 80 with pressurized fuel. In some direct-injection applications, a camshaft-driven high-pressure fuel pump (not shown) may be used in combination with a low-pressure fuel pump 110 to provide a desired fuel pressure within fuel rail 112. Fuel pressure may be controlled within a predetermined operating range by a corresponding signal from controller 22. In the representative embodiment illustrated in FIG. 1, fuel injector 80 is side-mounted on the intake side of combustion chamber 14, typically between intake valves 16, and injects fuel directly into combustion chamber 14 in response to a command signal from controller 22 processed by driver 82. Of course, the present disclosure may also be applied to applications having fuel injector 80 centrally mounted through the top or roof of cylinder 14.

Driver 82 may include various circuitry and/or electronics to selectively supply power from high-voltage power supply 120 to actuate a solenoid associated with fuel injector 80 as described in greater detail with reference to FIGS. 2-3 and may be associated with an individual fuel injector 80 or multiple fuel injectors, depending on the particular application and implementation. Although illustrated and described with respect to a direct-injection application where fuel injectors often require high-voltage actuation, those of ordinary skill in the art will recognize that the teachings of the present disclosure may also be applied to applications that use port injection or combination strategies with multiple injectors per cylinder and/or multiple fuel injections per cycle.

In the embodiment of FIG. 1, fuel injector 80 injects a quantity of fuel directly into combustion chamber 14 in one or more injection events for a single engine cycle based on the current operating mode in response to a signal (fpw) generated by controller 22 and processed and powered by driver 82. At the appropriate time during the combustion cycle, controller 22 generates a signal (SA) processed by ignition system 84 to control spark plug 86 and initiate combustion within chamber 14, and to subsequently apply a high-voltage bias across spark plug 86 to enable ionization current sensing as described herein. Depending upon the particular application, the high-voltage bias may be applied across the spark gap or between the center electrode of spark plug 86 and the cylinder wall. Ignition system 84 may include one or more ignition coils and other circuitry/electronics to actuate associated spark plugs 86 and provide ion sensing. Charging of the ignition coil may be powered by high-voltage power supply 120 or by battery voltage as described with reference to FIGS. 2 and 3, respectively. However, use of the boosted voltage provided by high-voltage power supply 120 may provide various advantages, such as reducing ignition coil charge time and dwell time, which generally allows greater ignition timing flexibility and/or a longer ionization sensing period.

In one embodiment, each spark plug 86 includes a dedicated coil and associated electronics. Alternatively, a single ignition system 84 may be associated with multiple spark plugs 86. In addition, ignition system 84 may include various components to provide ionization current sensing as describe with reference to FIGS. 2-3. The representative embodiment illustrated includes a single spark plug 86 in each cylinder that functions to ignite the fuel mixture and then as the ion sensor as described herein. However, the present disclosure may be used in applications that use dual spark plugs with one or both providing mixture ignition and/or ion sensing. Likewise, embodiments of the present disclosure may incorporate other types of devices that may be used to provide an ionization signal, such as a glow plug or a special-purpose, dedicated ionization sensor. According to the present disclosure, at least one common power supply 120 is connected to at least one fuel injector 80 and at least one ionization sensor (implemented by spark plug 86 in the representative embodiment illustrated) and supplies a voltage $V_{BOOST}$ higher than the battery voltage $V_{BAT}$ during at least a portion of the engine operating cycle as described in greater detail herein.

Controller 22 includes software and/or hardware implementing control logic to control system 10. In one embodiment, controller 22 controls high-voltage power supply 120, fuel injector 80, and spark plug 86 such that power supply 120 selectively provides substantially the same boosted nominal voltage (relative to battery voltage) to fuel injector 80 via driver 82 and to spark plug 86 via ignition system 84. Of course, the actual voltages may vary as a function of ambient and operating conditions. Similarly, different boosted nominal voltage may be supplied to the fuel injectors 80 and spark plugs 86 or other ionization current sensors depending upon the particular application and implementation.

Figure 2:
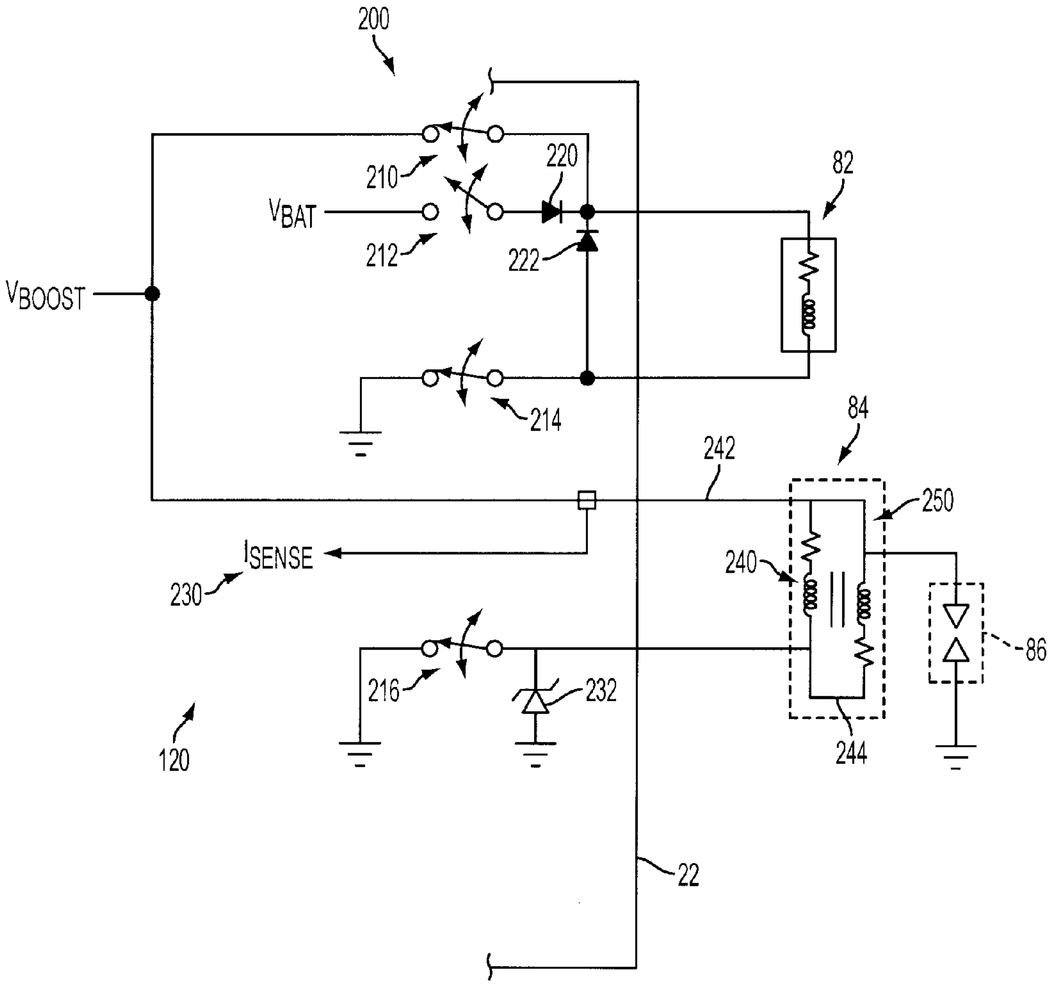
FIG. 2 is a simplified schematic illustrating one embodiment of an engine controller with a common power source for injectors and ion sense according to the present disclosure.

FIG. 2 is a simplified schematic illustrating connections for, and operation of, an integrated high-voltage power supply according to one embodiment of the present disclosure. In this embodiment, power supply 120 is integrated with engine/vehicle controller 22 and includes a plurality of switches 200 for selectively connecting various inputs/outputs in response to the control logic within controller 22 during operation. Switches 22 may be implemented by one or more types of solid-state devices, such as transistors and/or relays, for example, and are operated in response to control signals to selectively supply substantially the same nominal voltage to the fuel injectors and ionization sensors from the same high-voltage power supply 120 during different portions of the engine operating cycle. The present disclosure recognizes that operation of the fuel injector solenoids 82 generally requires a high voltage and corresponding high current to initiate the fuel injection event followed by a lower voltage and associated holding current to complete the event. As such, the high-voltage power supply is used for only a small portion of the operating cycle. Ionization current sensing also uses a high-voltage bias to generate a very small (on the order of microamperes) current during a different portion of the engine operating cycle (after ignition) so that a common high-voltage power supply may be used. For spark-ignition applications, the high-voltage power supply may also be used to charge the ignition coil so that charging times and dwell times may be reduced as previously described.

In operation, switch 210 and switch 214 are closed to selectively connect fuel injector solenoid 82 to the high-voltage supply, $V_{BOOST}$. Current is blocked by diodes 220 and 222 and flows through solenoid coil 82 to initiate a fuel injection event. A holding current may subsequently be applied using battery voltage and appropriate actuation of switches 210, 212, and 214 to complete the fuel injection event. Substantially the same voltage from the high-voltage supply 120 may be used to charge ignition coil 84 to generate a spark across the air gap of spark plug 86, and subsequently to apply a bias voltage to induce an ionization current signal, $I_{sense}$, indicative of combustion quality and timing within the corresponding cylinder. To charge ignition coil 84, switch 216 is closed connecting one side 244 of primary winding 240 to ground with the other side 242 of primary winding 240 connected to the boost voltage causing current to flow through primary winding 240. Soft turn-on technology may be used to ensure that the spark discharge event does not occur at the initiation of coil charging rather than the at the desired coil turn-off time. When the control logic of controller 22 generates a spark signal, switch 216 is opened to collapse the magnetic field of coil 84 and induce a high voltage (on the order of kilovolts) in secondary winding 250 resulting in a spark discharge across the electrodes of spark plug 86 to initiate combustion within the corresponding cylinder. The boost voltage is then used as a bias voltage across spark plug 86 with ions generated during combustion of the fuel/air mixture within the cylinder conducting across the air gap of spark plug 86 and generating a small ionization current 230 detected by controller 22. A current minor or similar circuitry may be integrated into ignition system 84 or controller 22 to detect and amplify the ionization current signal.

As illustrated in the embodiment of FIG. 2, the bias voltage for the ionization sensing is provided by the high-voltage power supply 120 rather than a charge capacitor or the ignition coil itself so that ionization sensing may be provided whether or not the coil is charged to initiate a spark. In the example above, if the engine subsequently operating in a HCCI mode, the bias voltage may still be applied across the electrodes (or from an electrode to cylinder wall) of spark plug 86 without closing switch 216 to charge the ignition coil.

Figure 3:
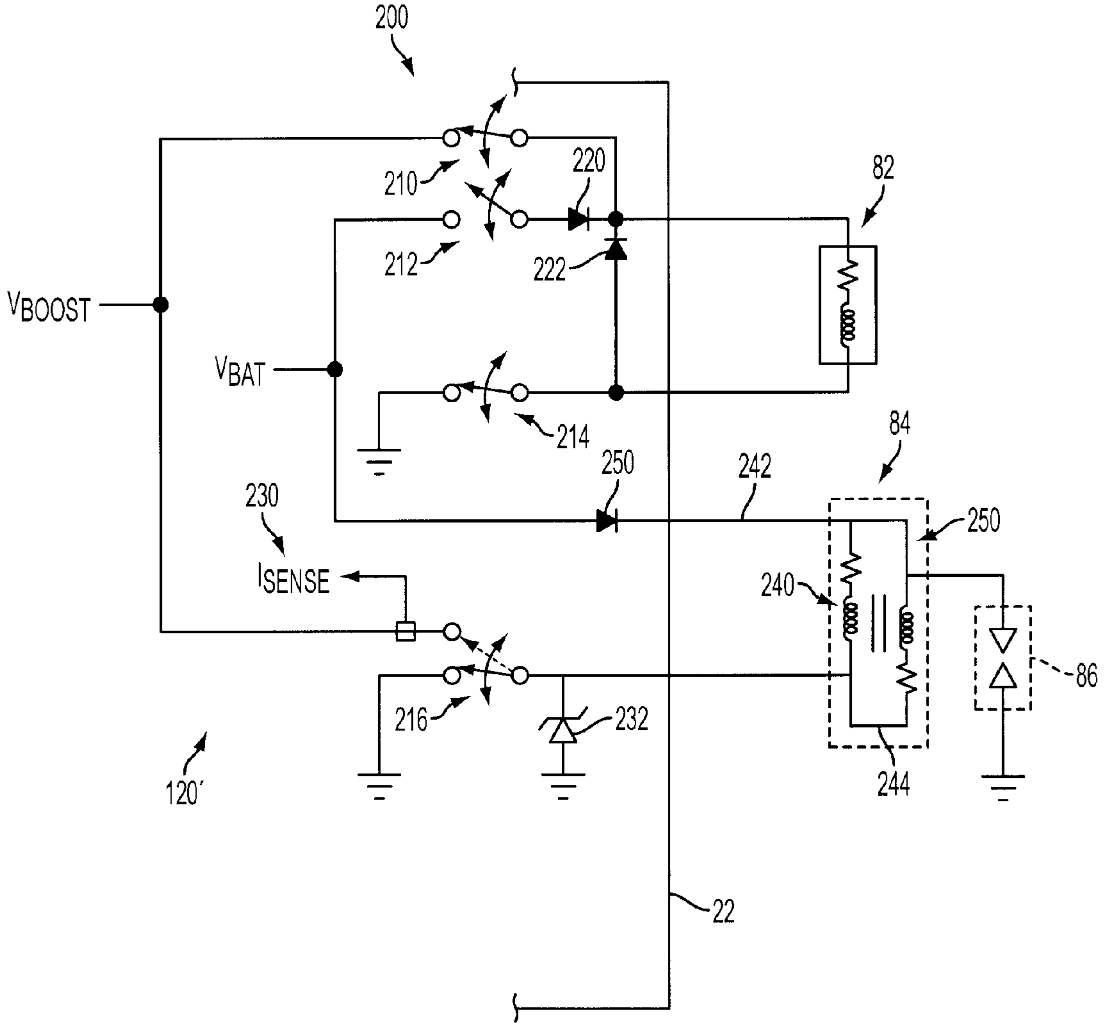
FIG. 3 is a simplified schematic illustrating an alternative embodiment of an engine controller with a common power source for injectors and ion sense according to the present disclosure.

FIG. 3 is a simplified schematic of an alternative embodiment of a high-voltage power supply for ionization sensors and fuel injectors according to the present disclosure. In this embodiment, fuel injector solenoid 82 is operated as previously described with respect to FIG. 2. However, power supply 120' uses battery voltage to charge ignition coil 84 through diode 250 and selectively connects the boosted voltage to side 244 of primary winding 240 via switch 216 to collapse the magnetic field in coil 84 and initiate the spark event. As such, in this embodiment, the ignition coil is controlled by selectively switching side 244 of primary winding 240 between the high voltage power supply and ground. The boosted voltage provides a bias across the gap of spark plug 86 that facilitates generation of an ionization current signal 230 as conducting ions are formed during the subsequent combustion of the fuel/air mixture within the associated cylinder.

As such, the present disclosure includes embodiments that provide a shared high-voltage power supply for ionization current sensors and fuel injectors that facilitates ionization current sensing whether or not a spark plug discharge is provided, such as in compression ignition engines or operating modes including diesel engines and HCCI engines, for example. The availability of a high-voltage power supply in spark-ignited applications for use in charging the ignition coil facilitates more agile ignition timing with shorter ignition coil charge times and shorter dwell times, which in turn provides a larger time period for collecting ionization current data, which is typically masked during coil/spark discharge. Using a single high-voltage power supply to actuate injectors and ionization sensing according to the present disclosure may also provide a cost savings and reduce the number of control module pins required when the power supply is integrated in the engine controller.

While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electrical power system for a direct-injection multiple cylinder internal combustion engine having a fuel injector and spark plug associated with each cylinder, the fuel injector injecting fuel directly into the cylinder in response to a control signal, the spark plug having an associated ignition coil for selectively operating as an ignition source and ionization sensor, the power system comprising:

a high voltage power supply connectable to, and supplying substantially the same nominal boosted voltage higher than nominal battery voltage to, the fuel injectors and ignition coil during an ionization sensing period after spark discharge.

2. The electrical power system of claim 1 wherein each ignition coil includes a primary winding with a first side connected to the high voltage power supply at least during the ionization sensing period and a secondary winding connected to the spark plug.

3. The electrical power system of claim 2 wherein the ignition coil primary winding has a second side connected to battery voltage and wherein the ignition coil is controlled by switching the first side between the high voltage power supply and ground.

4. The electrical power system of claim 2 wherein the ignition coil primary winding has a second side selectively connected to ground and wherein the ignition coil is controlled by switching the second side between a high impedance and ground.

5. The electrical power system of claim 1 wherein the high voltage power supply is integrated into a microprocessor-based engine controller for controlling operation of the ignition coil and fuel injectors.

6. An electrical power system for an engine powered at least in part by a battery having a battery voltage and including a fuel injector and at least one ionization sensor, comprising:

at least one common power supply connected to the fuel injector and the ionization sensor and supplying a voltage higher than the battery voltage for operation of the fuel injector and the ionization sensor at least during an ionization sensing period after spark discharge.

7. The electrical power system of claim 6 wherein the ionization sensor comprises a spark plug.

8. The electrical power system of claim 6 further comprising:

an ignition coil having a primary winding with a first side connected to the common power supply at least during the ionization sensing period and a secondary winding connected to the ionization sensor.

9. The electrical power system of claim 8 wherein the ignition coil primary winding has a second side connected to battery voltage and wherein the ignition coil is controlled by switching the first side between the common power supply and ground.

10. The electrical power system of claim 8 wherein the ignition coil primary winding has a second side selectively connected to ground and wherein the ignition coil is controlled by switching the second side between a high impedance and ground.

11. The electrical power system of claim 6 wherein the common power supply provides substantially the same nominal voltage to the fuel injector and the at least one ionization sensor.

12. The electrical power system of claim 6 further comprising a microprocessor-based engine controller in communication with the fuel injector and the at least one ionization sensor wherein the at least one common power supply is contained within the engine controller.

13. The electrical power system of claim 6 further comprising:

circuitry for selectively supplying battery voltage to a primary winding of an ignition coil to charge the ignition coil; and circuitry for selectively supplying high voltage to the primary winding of the ignition coil during an ionization current sensing period after discharging the ignition coil.

14. The electrical power system of claim 6 wherein the fuel injector comprises a direct-injection fuel injector for injecting fuel directly into a corresponding cylinder during operation.

15. An electrical power system for a direct-injection multiple cylinder internal combustion engine having a fuel injector and spark plug associated with each cylinder, the fuel injector injecting fuel directly into the cylinder in response to a control signal and the spark plug operating as at least an ionization sensor, the power system comprising:

an ignition coil coupled to at least one of the spark plugs for operating as at least an ionization sensor; and a microprocessor-based engine controller coupled to the ignition coil and having a high voltage power supply selectively connectable to, and supplying substantially the same nominal boosted voltage higher than nominal battery voltage to, the fuel injectors and ignition coil at least during an ionization sensing period after spark discharge, the engine controller selectively supplying a lower voltage control signal to the fuel injectors and ignition coil to control fuel injection and spark discharge, respectively.

16. The electrical power system of claim 15 wherein the engine controller selectively supplies battery voltage to a primary winding of the ignition coil to charge the ignition coil in preparation for spark discharge and selectively supplies high voltage to the primary winding of the ignition coil during the ionization sensing period after discharging the ignition coil.

17. The electrical power system of claim 15 wherein the ignition coil comprises a primary winding with a first side coupled to the high voltage power supply during the ionization sensing period and a secondary winding connected to the spark plug.

18. The electrical power system of claim 17 wherein the ignition coil primary winding has a second side coupled to battery voltage and wherein the engine controller controls the ignition coil by switching the first side between the high voltage power supply and ground.

19. The electrical power system of claim 17 wherein the ignition coil primary winding has a second side selectively coupled to ground and wherein the engine controller controls the ignition coil by switching the second side between a high impedance and ground.

20. The electrical power system of claim 15 wherein the engine controller applies a bias voltage to the spark plug from the high voltage power supply after spark discharge to induce an ionization current indicative of combustion within the cylinder.

* * * * *